United States Patent [19]

Midorikawa

[11] Patent Number: 4,937,595

[45] Date of Patent: Jun. 26, 1990

[54] INK JET RECORDING APPARATUS WITH CAP LOCKING MECHANISM

[75] Inventor: Masaru Midorikawa, Tokyo, Japan

[73] Assignee: Seiko Instruments, Chiba, Japan

[21] Appl. No.: 370,996

[22] Filed: Jun. 26, 1989

[30] Foreign Application Priority Data

Jun. 27, 1988 [JP] Japan ............................ 63-85406[U]

[51] Int. Cl.[5] ............................................ G01D 15/18

[52] U.S. Cl. .................................... 346/140 R; 346/75

[58] Field of Search .............................. 346/75, 140 R

[56] References Cited

U.S. PATENT DOCUMENTS 4,177,471 12/1979 Mitchell .......................... 346/140 R 4,187,511 2/1980 Robinson .............................. 346/75

*Primary Examiner*—Bruce A. Reynolds

*Assistant Examiner*—Gerald E. Preston

*Attorney, Agent, or Firm*—Spensley Horn Jubas & Lubitz

[57] ABSTRACT

An ink jet recording apparatus composed of a housing having an ink cartridge receiving portion, an ink jet recording head in the housing having an ink jet nozzle for spraying ink drops, a head moving device for moving the recording head reciprocally, a paper feeder for feeding a paper sheet in a direction perpendicular to the moving direction of the head, an ink supplying cartridge inserted at the ink cartridge receiving portion for storing an ink, ink supplying tubes connected between the recording heads and the ink supplying cartridge when the ink supplying cartridge is inserted at the ink cartridge receiving portion, a capping device in the housing for capping the ink jet nozzle, a lock cartridge arranged to be inserted at the ink cartridge receiving portion instead of the ink supplying cartridge, a locking device for locking the head capping state of the capping device when the locking cartridge is inserted at the ink cartridge receiving portion.

6 Claims, 4 Drawing Sheets

INK JET RECORDING APPARATUS WITH CAP LOCKING MECHANISM

BACKGROUND OF THE INVENTION

This invention relates to an ink jet recording apparatus having a capping mechanism for capping ink jet nozzles, and more particularly to an ink jet recording apparatus having a capping mechanism which caps ink jet nozzles by pushing a cap against the nozzle surface by the elastic force of a spring or the like.

A detailed explanation will be given of the conventional ink jet head capping device.

FIG. 4 shows in simplified form the capping mechanism of a conventional ink jet recording apparatus. A gear 2 is rotated by receiving a driving force from a motor 1, and transfers the rotating force to a rotary cam 4 via a rotary shaft 3. Arm 4 produces a rocking movement of a cap supporting arm 6 about an axis 6'. The rotary cam 4 is connected to rotary shaft 3 via a torque transmitting spring, and is able to put on or draw off an ink jet head cap 7 by means of the forward or reverse rotation of motor 1.

During a time when printing is stopped, the ink jet head unit 8 is slid along ink jet head supporting shafts 13, in a direction perpendicular to the plane of FIG. 4 to stop at the capping position above the ink jet head capping device. Rotary cam 4 is then rotated by motor 1 in the forward direction (in the direction of the arrow of FIG. 4) until rotary cam 4 moves out of contact with head cap supporting arm 6. Then, head cap supporting arm 6 is pivoted by spring 11 to raise head cap 7 into the capping position.

At the time of head cleaning, motor 1 continues forward rotation, and a cleaning pump driven by the rotation of gear 2 effects suction performance. During this time, rotary cam 4 stops rotation and rotary shaft 3 continues rotating, by the function of the transmitting spring.

At the time when cap 7 is to be removed, rotary cam 4 is rotated in the reverse direction by motor 1 and is touched to the head cap supporting arm 6 to pull down the ink jet head cap 7 and place it in the open state.

As described above, at the time of stopped printing or head cleaning, the elastic force of the spring 11 maintains the capping state.

In the case of the conventional example as described above, there are the advantages that the cost is low and miniaturization is possible. However, in the conventional case where single colored copying was the main trend, since miniaturization of the head was possible, the capping state could be maintained for the oscillation in the time of transference by the elastic force of an elastic material such as a spring. However, in the case of multi-color copying, which is increasingly in demand, there is a limit in the miniaturization of the head due to the multi-nozzle formation required for this type of copying.

Corresponding to the large size of the head, the head capping device also has come to be formed in a large size.

In the case of capping devices of large size such as described above, it is difficult to maintain the capping state, and due to the oscillation at the time of transference, the ink jet caps oscillate, together with shrinkage of the maintaining elastic material, and there are generated such drawbacks as the clogging of the head due to the leakage of ink and intrusion of dust, damage to the device due to the shock of the oscillation, and the like.

SUMMARY OF THE INVENTION

It is therefore an object of the invention to provide an ink jet recording apparatus without leakage in the region between the ink jet nozzle face and the cap and without the clogging of the ink jet nozzle due to the intrusion of dust.

It is another object of the invention to provide an ink jet recording apparatus in which damage to the head due to the shock of the impulse of oscillation can be prevented.

These and other objects of the invention are accomplished by an ink jet recording apparatus comprising a housing having an ink cartridge receiving portion, an ink jet recording head in the housing having an ink jet nozzle for spraying ink drops, head moving means for moving the recording head reciprocally, paper feeding means for feeding a paper sheet in a direction perpendicular to the moving direction of the head, an ink supplying cartridge inserted at the ink cartridge receiving portion for storing ink, ink supplying tubes connected between the recording heads and the ink supplying cartridge when the ink supplying cartridge is inserted at the ink cartridge receiving portion, capping means in the housing for capping the ink jet nozzle, a lock cartridge insertable at the ink cartridge receiving portion instead of the ink supplying cartridge, and locking means for locking the head capping state of the capping means when the locking cartridge is inserted at the ink cartridge receiving portion.

The capping means may include a capping portion and pressing means for pressing the capping portion against the ink jet nozzle by an elastic force.

The pressing means includes a lever for moving the capping portion.

The locking means may include another lever means for locking the movement of the lever of the pressing means when the lock cartridge is inserted to the cartridge receiving portion.

The lock cartridge may include a projection portion for pressing an end portion of the lever of the locking means.

Another end portion of the lever of the locking means has a rock pin for fixing the lever of the capping means.

DESCRIPTION OF THE PREFERRED EMBODIMENTS

Figure 1:
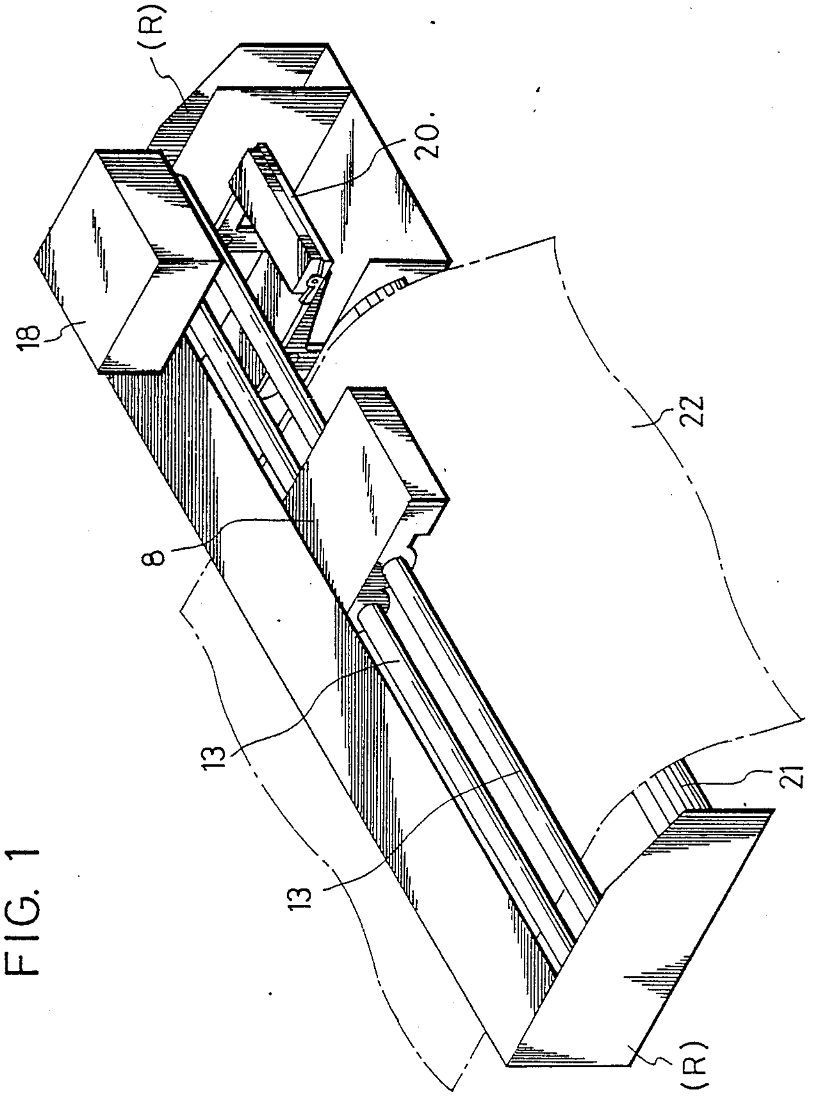
FIG. 1 is a perspective view of an ink jet recording apparatus according to the invention.

Figure 1 shows a plotter having apparatus according to the invention. In FIG. 1, the plotter comprises a casing having two side panels (R) and a platen 21 held between them, a paper feeding mechanism (not shown) for feeding paper sheets to the platen, two shafts 13 held between the two side panels (R), and over platen 21, an ink jet head 8 having a plurality of ink jet nozzles on its under face and slidably provided on the two shafts 13, a head moving mechanism (not shown) for moving head 8 along shafts 13, a capping unit 20 for capping the ink jet nozzles at the time when head 8 is moved thereover and installed below shafts 13 in a housing provided on the right side of the casing if viewed toward the front side of the plotter, a receiving portion provided above capping unit 20 on a top plate of the casing, and a capping unit lock mechanism for locking the movement of the capping unit when a transferring cartridge 18 is inserted into the cartridge receiving portion. The cartridge receiving portion has an ink receptacle therein. The ink receptacle is connected to ink jet head 8 by ink supplying tubes for supplying ink to the ink jet nozzles when the ink cartridge is inserted into the cartridge receiving portion. At the time when plotting is stopped or at the time of head cleaning, ink jet head 8 is slid along shafts 13 to stop at the position above capping unit 20 and the ink jet head cap rises to cap the ink jet nozzles. The ink jet head cap is made of an elastic material such as a rubber and has a sucking nozzle for sucking any ink remaining in the ink jet nozzles. The sucking nozzle is connected to a cleaning pump driven in synchronism with capping movement.

The locking mechanism for locking the capping unit to maintain capping state is installed below the ink cartridge receiving portion. The locking mechanism operates to insert the transferring cartridge to the ink cartridge receiving portion. When the plotter is transferred, the transferring cartridge is inserted to the cartridge receiving portion instead of the ink cartridge and the capping movement is locked to maintain the capping state so as to prevent ink leakage and the nozzle clogging with dust. The transferring cartridge also has the function of capping the ink receptacle.

Figure 2:
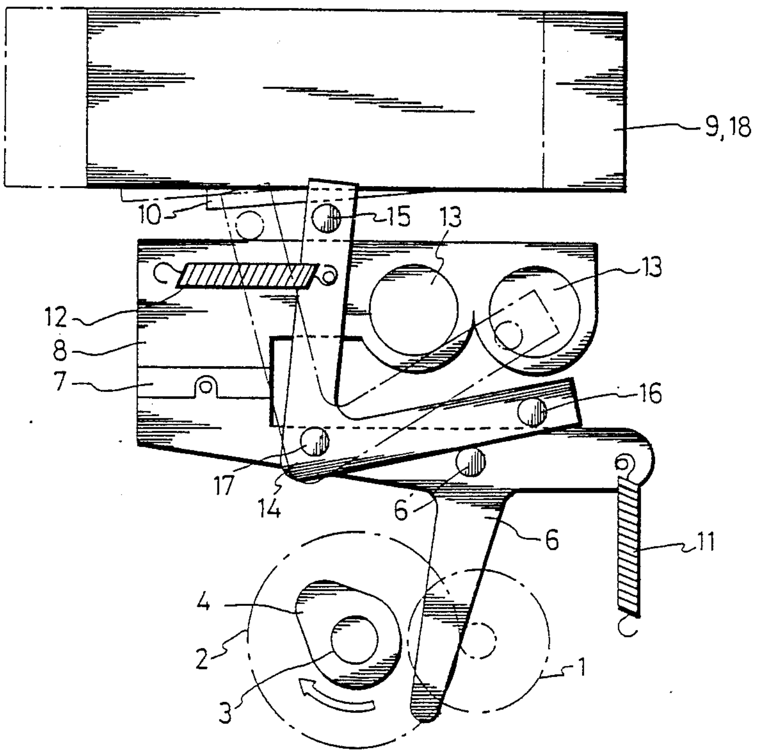
FIG. 2 is a section view of the capping portion and locking portion of the recording apparatus of FIG. 1.
Figure 3:
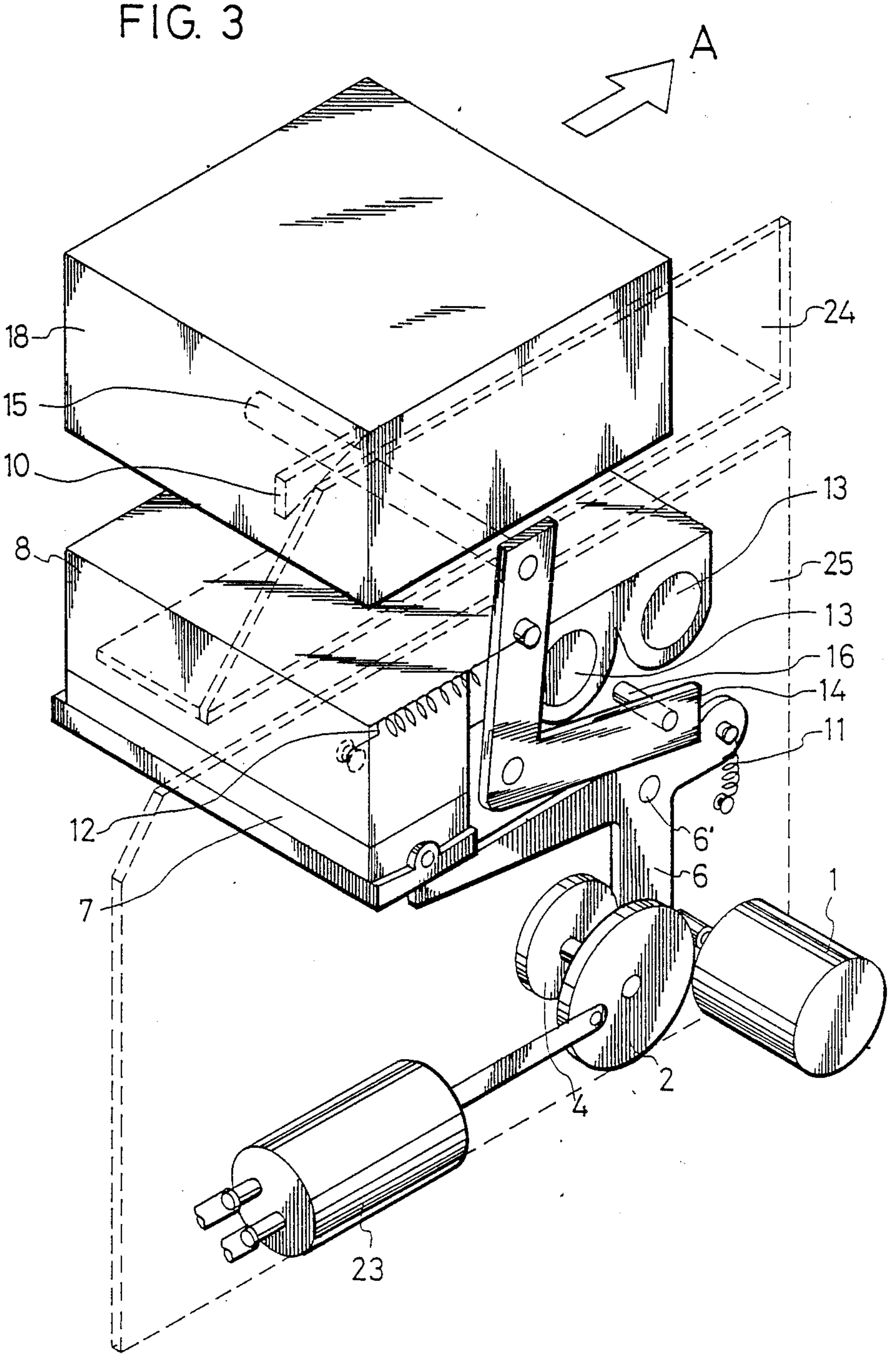
FIG. 3 is a perspective view of the capping portion and locking portion of the recording apparatus according to the invention.
Figure 4:
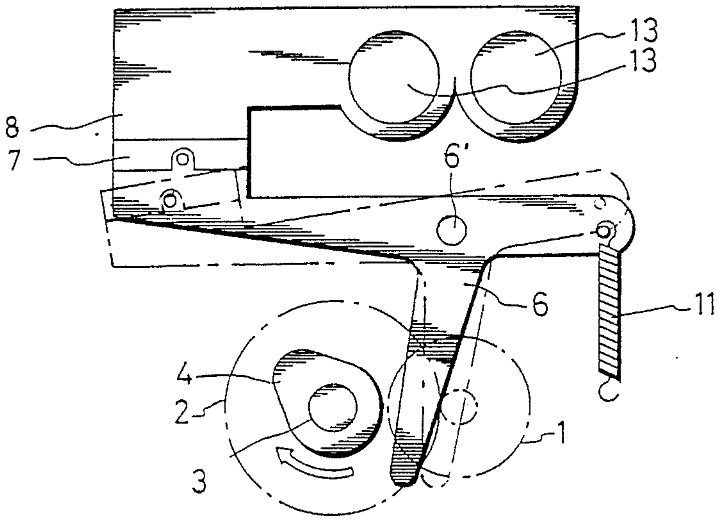
FIG. 4 PRIOR ART
FIG. 4 is a sectional view of a capping portion of a conventional ink jet recording apparatus.

FIGS. 2 and 3 show the detail of the capping unit and lock mechanism. The capping unit comprises a motor 1, a gear 2 rotated by motor 1, a cam 4 mounted on a shaft 3 fixed to gear 2 through a torque transmitting spring, a T-shaped cap supporting arm 6 pivoted at 6' at the center to a housing side plate 25, an ink jet cap 8 provided on one shoulder, or branch, of the T-shaped arm, a spring 11 connected between the other shoulder of the T-shaped arm and housing side plate 25 so that ink jet cap 8 is pushed against the ink jet nozzle face. Cam 4 is shaped so as to contact the stem of arm 6 only when the cap is open.

Gear 2 is rotated by receiving the driving force of motor 1, and transfers the rotating force to rotary cam 4 via a rotary shaft 3 to let it generate an oscillating movement of cap supporting arm 6. The rotary cam 4 is connected to a rotary shaft 3 via the torque transmitting spring, and is able to apply or remove ink jet head cap 7 by means of the forward and reverse rotation of the motor 1.

When no printing is being effected, ink jet head unit 8 is slid along ink jet head supporting shaft 13 to stop at the capping position over ink jet head capping unit. Then rotary cam 4 is rotated by motor 1 in the forward direction (counterclockwise in FIG. 2) until rotary cam 4 separates from the head cap supporting arm. Head cap supporting arm 6 is then pulled up by spring 11 to enter into the capping position, i.e., to apply cap 7 to the nozzles.

At the time of head cleaning, motor 1 continues forward rotation, and the cleaning pump effects suction performance. During this time, rotary cam 4 stops rotation and the rotary shaft continues rotating by the function of the transmitting spring.

At the time of release of capping, rotary cam 4 is rotated in the reverse direction, and contacts head cap supporting arm 6 to pull the ink jet head cap 7 down and to let it move to the open position.

In FIGS. 2 and 3, the rocking mechanism comprises a V-shaped single piece 14 pivoted at a pin 17 at its corner to side plate 25, a shaft member 15 provided on the end of one arm of angle piece 14 so as to be pushed by a projection 10 of transferring cartridge 18 when cartridge 18 is inserted along a guide 24, and a lock pin 16 provided on the end of the other arm of angle piece 14 so as to be pushed against the T-shaped lever arm 6 when angle piece 14 is rotated.

If the plotter is to be moved, i.e., transported or shipped, the ink cartridge in use is removed and, in place of it, the transferring cartridge 18 equipped with the protruded part 10 in the bottom part is inserted. This protruded part 10 contacts to the rod-like member 15 to rotate the angle 14 supporting the rod-like member 15. The angle piece 14 is pivoted on the pivot 17, and, on the other arm of angle piece 14, the lock pin 16 determines the position of head cap supporting arm 6. Also, the transferring cartridge 18 is arranged in the upper part of the ink jet head unit 8, and is used for the object of capping the ink supplying receptacle to prevent the flow out of the ink.

After completing such a move, the plotter can be placed back in operating condition by bringing the lock to the open state by pulling out the transferring cartridge 9 so that piece 14 is pivoted by lock opening spring 12.

As described above, in the use of the ink jet printing device, the ink jet head cap is fixed and the reverse flow of ink from the ink supplying part is prevented by only inserting the transferring cartridge 9. By providing a lock mechanism for use during transfer time in the conventional ink jet head capping device, the oscillation of the ink jet head cap by the shrinkage of the spring due to the oscillation in the transfer time can be prevented, the ink leakage in the space between the ink jet head part and the cap part caused thereby, clogging of the head due to the intrusion of dust, and furthermore, damage and the like of the device due to the shock of the impulse of the oscillation can be prevented. Further, since locking is effected by a projecting part in a part of the transferring cartridge, as a countermeasure for the flow of ink in the conventional transference, the embodiment can be realized cheaply and at the same time with the installation of the transferring cartridge for the prevention of the reverse flow of the ink supplying part without increasing the procedures in the time of the transference and without bothering the copying operator.

What is claimed is:

1. An ink jet recording apparatus comprising:

a housing having an ink cartridge receiving portion;

an ink jet recording head mounted in said housing and having an ink jet nozzle for spraying ink drops;

head moving means for moving said recording head reciprocally along a path;

paper feeding means for feeding a paper sheet in a direction perpendicular to the path;

an ink supplying cartridge arranged to be inserted at said ink cartridge receiving portion for storing a supply of ink;

ink supplying tubes connected between said recording head and said ink supplying cartridge when said ink supplying cartridge is inserted at said ink receiving portion;

capping means in said housing for capping said ink jet nozzle;

a lock cartridge arranged to be inserted at said ink cartridge receiving portion in place of said ink supplying cartridge; and locking means for locking said capping means in a position for capping said nozzle when said locking cartridge is inserted at said ink cartridge receiving portion.

2. An ink jet recording apparatus as claimed in claim 1 wherein said capping means includes a capping portion and pressing means for pressing said capping portion against said ink jet nozzle by an elastic force.

3. An ink jet recording apparatus as claimed in claim 2 wherein said pressing means includes a lever connected for moving said capping portion.

4. An ink jet recording apparatus as claimed in claim 3 wherein said locking means includes another lever means connected for locking the movement of said lever of said pressing means when said lock cartridge is inserted at said cartridge receiving portion.

5. An ink jet recording apparatus as claimed in claim 4 wherein said lock cartridge includes a projection portion for pressing an end portion of said lever means of locking means for holding said lever means in a position to lock the movement of said lever of said pressing means.

6. An ink jet recording apparatus as claimed in claim 5 wherein another end portion of said lever means of said locking means has a rock pin for fixing said lever of said pressing means.

* * * * *